United States Patent [19]

Burmeister

[11] 4,116,324
[45] Sep. 26, 1978

[54] LOADING DEVICE
[75] Inventor: Karl-Heinz Burmeister, Kleve, Niederrhein, Fed. Rep. of Germany
[73] Assignee: Ipsen Industries International Gesellschaft mit beschränkter Haftung, Kleve, Niederrhein, Fed. Rep. of Germany
[21] Appl. No.: 735,977
[22] Filed: Oct. 27, 1976
[30] Foreign Application Priority Data
Nov. 8, 1975 [DE] Fed. Rep. of Germany ....... 2550323
[51] Int. Cl.² .............................................. B65G 25/12
[52] U.S. Cl. .................... 198/472; 198/485; 198/610; 198/621; 198/748; 214/23
[58] Field of Search ............... 198/472, 485, 610, 621, 198/648, 741, 747, 748, 345, 629, 740; 214/21, 23

[56] References Cited
U.S. PATENT DOCUMENTS 2,681,136 6/1954 Ipsen ...................................... 198/486
2,940,619 6/1960 Schramm et al. ..................... 198/610
3,104,768 9/1963 Bassett .................................. 214/23
3,521,765 7/1970 Kauffman et al. ..................... 214/23

OTHER PUBLICATIONS

IBM Technical Disclosure Bulletin, vol. 18, No. 7 12/75 pp. 2225, 2226 "Transfer Mechanism", Feldborg et al.

Primary Examiner—Joseph E. Valenza
Attorney, Agent, or Firm—Martin A. Farber

[57] ABSTRACT

A loading device for the conveyance of containers with a driven endless chain, on which at least one driver is fastened. Parallel to the transporting chain stringer portion of the driven endless chain, a loading rod is axially displaceably disposed and is arranged releaseably connected with the endless chain, which is provided with at least two adjustable drivers arranged spaced from one another provided on the loading rod, which in their transport position provide the connection for the endless chain and for the transport container.

8 Claims, 13 Drawing Figures

LOADING DEVICE

The present invention relates to a charging or loading device for the conveyance or transport of containers with a driven endless chain, on which at least one driver is fastened.

It is known to move transport containers or vessels by means of endless chains from one place on the loading device to a position beyond or outside of the loading device, and possibly by means of known coupling elements, such as drivers, fingers, dogs, pawls, ratchets or the like to again haul the containers back on the loading device. In this manner, it is disadvantageous, in that a transportation from one position over the loading device to a position again outside of the loading device, that is an overhead transport, is not possible. With known loading devices, a universal loading and unloading is not possible in directions displaced by 180° with respect to each other.

Such as possibility or transport for containers is for example provided by the known fork charger (stacker truck). In this manner the transport containers are lifted by the fork charger; the fork charger works or transports in its entirety inclusive of the transport container and the latter is set down on the working surface. For an overhead transportation the fork charger must be turned in the counter direction. In addition besides the already mentioned disadvantages, it is necessary to use either channels for the forks or pallets for the transport containers. Further, the length of the fork is limited and particularly in the heating spaces transport disturbances occur. Heating spaces for example constitute heat treatment furnaces for loading and for unloading and case-hardening or tempering furnaces. In consideration of the above state of the art the present invention has as its object the production of a charging or loading device by which there is facilitated in simpler manner an unhindered transportation of containers, particularly to heat treatment furnaces, in two direction which are opposed to each other by 180° without moving, turning or lifting of the device itself. Further this charging device should be guaranteed, without the necessity to provide measures on the working space, such as the arrangement of channels, cutouts and guides, with a compact construction of the device.

Another object of the present invention in accordance with the above-mentioned object is aided in its solution in that parallel to the transporting chain stringer portion of the driven endless chain, a loading rod (8 or 8a) is axially displaceable and is arranged detachably or releaseably connected with the endless chain (3 or 3a), which is provided with at least two adjustable drivers arranged spaced from one another provided on the loading rod, which in their transport position provide the connection for the endless chain (3 or 3a) and for the transport container (2). Preferably the loading or charging device of the invention in accordance with an advantageous formation is characterized in that, parallel to the endless chain (3 or 3a) a further endless chain is arranged with space therefrom, the two upper stringer portions (10, 10a) thereof carry the transport container, and both endless chains (3, 3a) are connected by two transverse extending driver rails (4, 4a) engaging the transport container in the middle position, respectively, from time to time on opposite sides of the container, and that both lower stringer portions (11) (when the leading device is in this middle position) are connected centrally by a transverse rail (5), whereby elements (6, 6a) for engaging the drivers (9) and/or the transverse rail (5) are provided on the transport container.

By the invention, there is provided a universal-charging device for loading and unloading objects from working places, also under the most difficult conditions and requirements, particularly on tempering furnaces, in two opposite directions. The device is constructed extremely short and flat; it is simple, robust and sturdy and requires no indentations in the working surface. Consequently it fulfils, the previously not heretofore achieved requirements. The basic concept for fulfilment of the aimed at transport function is essentially constituted in the proposal to arrange two chain strand belts parallel to one another and to equip same with driver rails and a transverse rail, whose action range is doubled by the arrangement of two parallel running loading or charger rods with adjustable drivers in both directions. Consequently it is advantageous to arrange a further loading rod (8a) parallel to the transporting stringer portion (10a) of the further endless chain (3a), which further loading rod is axially displaceable and operatively releaseably connected with the endless chain (3a), which is provided with at least two adjustable drivers (9) arranged spaced at a distance relative to one another, which drivers provide in their transport position the operative connection to the endless chain (3a) and to the transport container (2) and which corresponds with the drivers 9 of the other loading rod 8.

Advantageously each loading rod is arranged in a guide tube surrounding or enclosing it, which guide tube is mounted axially fixed and radially rotatable (in mounts 23) and is provided with a longitudinal slot through which there projects a driver element (9) of the loading rods (8, 8a). The drivers could constitute fingers welded on the loading rods.

It is further advantageous in accordance with the present invention to form the cooperating driver rails of the endless chains as rollers, which are mounted in brackets, the latter being connected respectively with a respective chain member. The transverse rail (5) and the coupling elements (6, 6a) of the transport container (2) could be provided on their ends with upwardly opening recesses, (19 and 21, respectively) or a corresponding box sectioning shape, in which the drivers (fingers 9) of the loading rods (8, 8a) are upwardly pivotable in and out, in the manner that the formation on the ends is made such that during the guiding the loading rods (8,8a) back empty into the starting position or moving the rods initially out of the starting position, the drivers (9) are in engagement with the transverse rail (5), however they are out of engagement from the container coupling elements (6,6a).

In order to guarantee universal utility for the loading device, according to a further formation of the invention, the loading device is formed laterally transportable or moveable and/or turnable about its vertical axis and/or liftable and lowerable. With this loading device in an advantageous manner, transportation containers may be moved three-dimensionally and universally, whereby the loading device can be mounted on the basis of its robust manner of construction under the most difficult requirements. It makes possible there a new arrangement-linkage, where heretofore absent transport functions were forced to be compromised.

With the above and other objects and advantages in view, the present invention will become more clearly understood from the following detailed description of a preferred embodiment of the invention, when considered with the accompanying drawings, of which:

Figure 1:
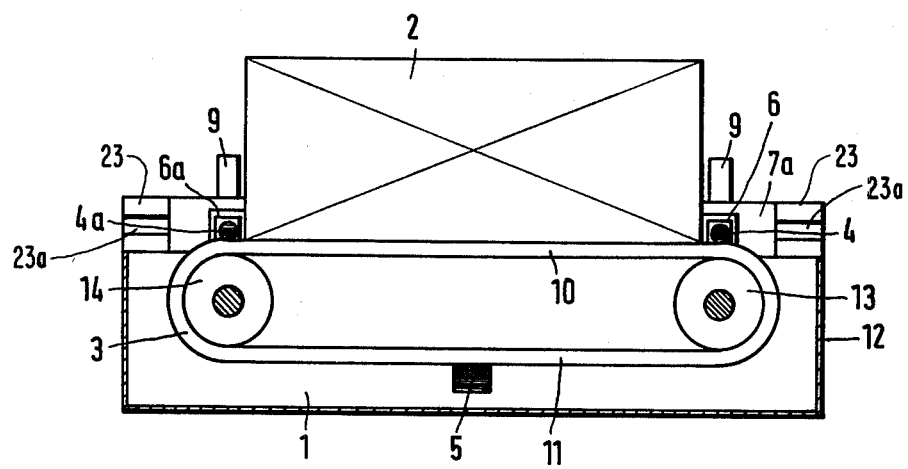
FIG. 1 is a side elevational view of a loading device in accordance with the present invention with a container thereon, in the central operational position.
Figures 3A, 3B:
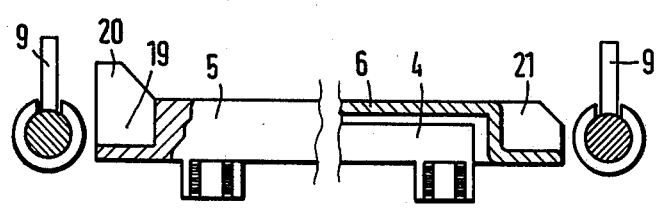
Figures 4A, 4B:
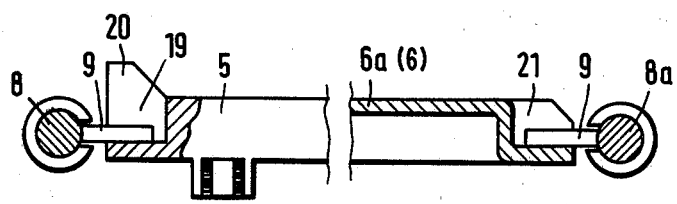
Figures 5A, 5B:
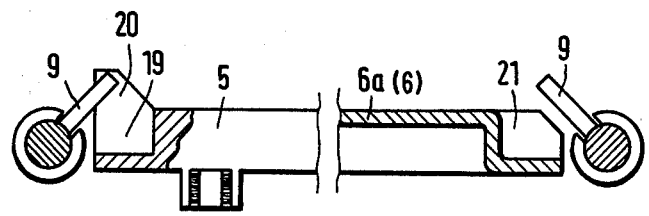

FIGS. 3a, 3b, 4a, 4b, 5a and 5b are fragmentary schematic cross-sectional views with omission of parts illustrated for the clarification of the function of the individual transport means, there being illustrated in FIGS. 3a, 4a and 5a the situation on the loading device and in FIGS. 3b, 4b and 5b the situation on the transport container in respective phases FIGS. 6–10 are schematic top plan views of the operational or performance course comprising the movement of a transport or carrying container from a working place to the left of the loading device of FIG. 1 to a working place to the right of the loading device, with only part of the loading device illustrated.

Figure 2:
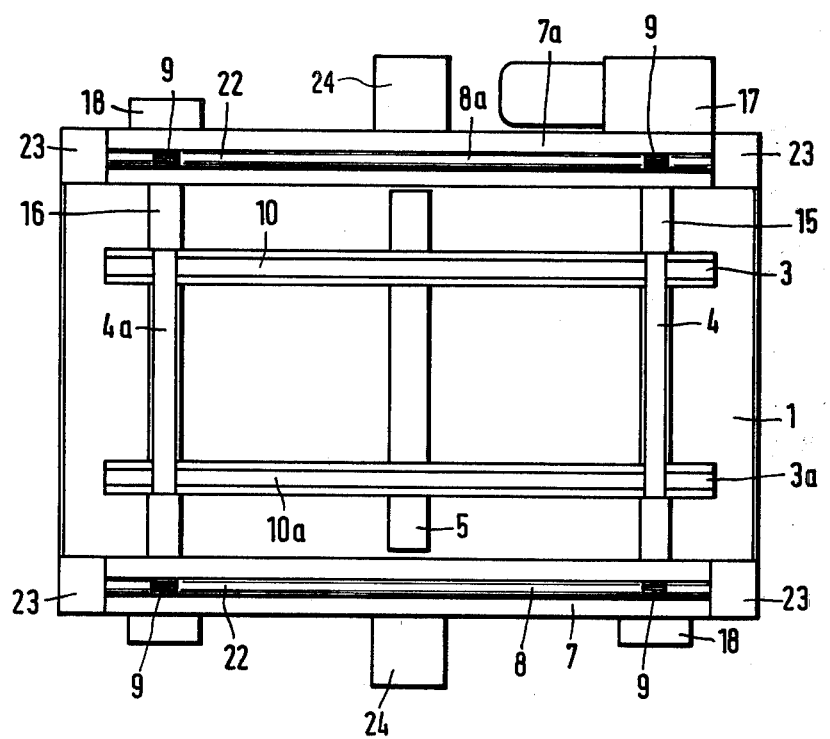
FIG. 2 is a top plan view of the loading device of FIG. 1 without showing the container.

Referring now to the drawings and more particularly to FIGS. 1 and 2, a loading device in accordance with the present invention serves for the loading and unloading of containers into casehardening or tempering furnaces in two opposite directions, respectively. In a box or case housing 12 there are mounted two endless chains which are spaced from one another and are parallel to one another, namely the chain belt loops (herein called strands) 3, 3a, which are mounted on chain wheels 13, 14, the latter wheels being arranged in a pair each on a shaft 15, 16, respectively. The shaft 15 is driven by means of a drive 17. The mountings or bearings 18 of the shafts 15 and 16 may be seen in FIG. 2.

According to FIG. 1 of the drawings, the loading device is located in the center position of the transport or conveying operation, as may be recognized by the arrangement of a transport container 2 on the chain strands 3, 3a. In this position there are respectively positioned on both sides of the transport container 2, above the axis or axle for the chain wheels, 13, 14, respectively, a driver roller 4, 4a each, the latter being connected to and connecting the two chain strands 3, 3a with each other in the transverse direction. The driver rollers 4, 4a are mounted rotatable in brackets or plates (not shown), which brackets respectively are secured on a chain member, respectively. Instead of a driver roller also a rigid or fixed rail could be used. The turning movement of the driver rollers 4, 4a however facilitates the transport or conveyance operation and prevents chipping out or rubbing spots. It is consequently used in this preferred embodiment form on the loading device. On the lower stringer i.e., the portions 11 of both chain strands 3, 3a which are connected to the conveying or transporting chain-upper stringer portions 10 and 10a, respectively, a transverse rail 5 is centrally arranged with respect to the FIG. 1 position. As may be seen from FIG. 2 of the drawings, the transverse rail 5 is formed longer than the driver rollers 4, 4a. The transverse rail 5 is a box section element, which is rigidly connected with the chain strands 3, 3a and runs along therewith as the driver rollers 4, 4a. On both ends, the transverse rail 5, as may be recognized from FIGS. 3a–5b of the drawings, is provided with an upwardly opening recess 19, and in the direction of movement is formed with forward-side and rear-side arranged trapezoidal shaped extensions or lugs 20.

In order to achieve the conveyance or transport object in accordance with the present invention, additionally with the illustrated and described loading device, it is necessary that the transport container 2 be mounted in the transport direction on the front side and on the rear side respectively with a coupling element for engaging or gripping the driver rolls 4, 4a. These elements constitute container means or rails 6, 6a, which are U-shaped in cross-section opening towards the bottom, that is an inverted U shape, which container rails 6, 6a are welded with the container and are able to hold the driver rollers 4, 4a in its respective opening which is accessible from the bottom, as may be seen from the right side of FIG. 3, as well as FIG. 1, of the drawings. The container rails 6, 6a however are altogether longer than the driver rollers 4, 4a namely likewise as long as the transverse rail 5. On their outermost ends, they are provided with recesses 21 which open upwardly as the transverse-rail 5, so that a similar formation on the end side is provided as that of the transverse rail 5, however without projections. (Compare please FIGS. 3a–5b of the drawings).

Parallel to the chain strands 3, 3a, on opposite sides of the box or case housing 12 in the working plane, that is the plane of the driver rollers 4, 4a, respectively, of the container rails 6, 6a according to FIG. 1 of the drawing, respectively a guide tube 7, 7a, respectively, each is secured on the box housing 12. A loading rod 8, 8a are each, respectively, arranged in the guide tubes 7, 7a, which guide tubes 7, 7a, respectively, are formed with a longitudinal slot 22. The guide tubes 7, 7a are axially fixed and are radially rotatable in corresponding mounting devices 23 the latter formed with inwardly facing slots 23a. Each loading rod 8, 8a is integrally equipped thereon with two fingers (also called drivers) 9, which have the same spacing from one another as that of the driver rollers 4, 4a, or the container rails 6, 6a. The total four fingers 9, two on each rod 8 engage through or penetrate the longitudinal slots 22 and are axially moveable with the respective loading rods 8, 8a, from time to time, as hereinafter explained, and are radially moveable with the respective guide tubes 7, 7a from time to time under the circumstances.

Illustrative phases of the rotational positions of the chains 3, 3a are illustrated in FIGS. 6–10 of the drawings. As particularly may be recognized from FIGS. 3a–5b, the fingers 9 in their individual respective twisting positions effect a connection with the corresponding loading rod 8, 8a, or decoupling, with either the container rails 6, 6a and/or the transverse rail 5. In this manner the fingers 9 engage in the case of coupling from above in the corresponding recess 19 and/or 21 to which it corresponds according to function.

Further on the case housing 12 there is arranged a setting or adjustment motor 24 for the motor adjustment or setting of the guide tubes, 7, 7a, respectively under the circumstances, which is controlled in a functionally dependent manner.

FIGS. 3a–5b show in cross-section the alternating or changing function of the driver rollers 4, 4a, the transverse rail 5, the container rails 6, 6a, and fingers 9. There, in the FIGS. 3a, 4a and 5a the situation from time to time on the loading device 1 is illustrated, and in FIGS. 3b, 4b and 5b the respective simultaneous condition on the transport container 2 is illustrated.

FIGS. 3a and 3b show a position which is designated as the "overhauling" position (and FIG. 8), in which on the transport or delivery container 2, the driver roller 4 is in engagement with, and in, the front container rail 6 in the movement direction. Consequently the transport container 2 is drawn or pulled on the loading device toward and into the position illustrated in FIG. 1 by the movement of the chain strands 3, 3a via the driver roller 4 in the rail 6. The fingers 9 are thereby swung out. When the position of FIG. 1 is achieved, both of the driver rollers 4, 4a engage positively without slipping in the corresponding container rails 6, 6a and with the drivers 9 still in the condition of FIG. 3, a further conveyance or transport of the transport container 2 is brought about up to the end of the chain loader (FIG. 9) by the further movement of the chain strands 3, 3a via the driver roller 4a engaging in the container rail 6a, the roller 4 having left the rail 6 after a little movement of the container 2 to the right from the FIG. 1 middle position.

Figure 7:
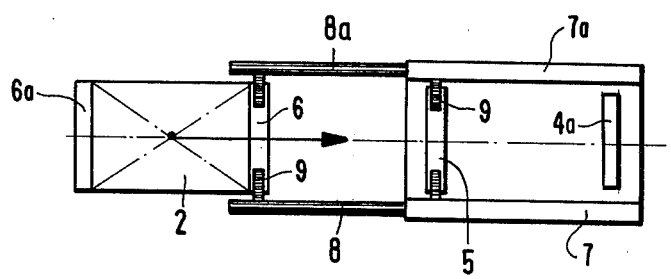

If now there is introduced after a further piece transport path, a tempering furnace, which is to be charged, the position of FIG. 4a and 4b (and FIG. 9) indicates this "charging" condition. In this manner the fingers 9 on one end respectively of the loading rods 8, 8a, are pivoted inwardly and engage, positively without slipping in the transverse rail 5 which now has come to the top of the chain strands, and the fingers 9 on the other end, respectively engage in the container rail 6a (or rail 6 if the reverse movement of FIG. 7 is considered). In the further movement path of the chain strands 3, 3a, the driver roller 4a leaves the container rail 6a and the transport container 2 is found outside of the loading device 1. The container 2 is forwardly moved by the loading or charging rods 8, 8a which are coupled operatively with the chain strands 3, 3a by means of the engaging fingers 9 via the transverse rail 5 and the container rail 6a.

If the tempering oven is loaded in this way, it is necessary, to move back and return the rods 8, 8a into the starting position. This operation is designated with the term "idling or travelling empty". The corresponding position is shown in FIGS. 5a and 5b (and FIG. 10). In this manner the fingers 9 completely pull only partly or are partially pivoted upwardly and disengage from the container rail 6a, in this manner by means of the different shape of the recesses 21 in comparision to the recesses 19, while they remain in engagement on the transverse rail 5 by the existing projections 20. In this position during the rearward movement of the chain strands 3, 3a, the loading rods 8, 8a are moved back "empty" into the base or starting position.

FIGS. 6-10 of the drawings show, by way of example, in top plan view, the movement of a transport container 2 from one working position to the left of the loading device 1 to a working position to the right of the loading device 1 with only portions of the loading device being illustrated for ease of clarity, namely the chains 3, 3a not being shown and only those respective rails 4, 4a, 5 being shown which are then present on the top of the chains in the respectively illustrated movement phases.

Figure 6:
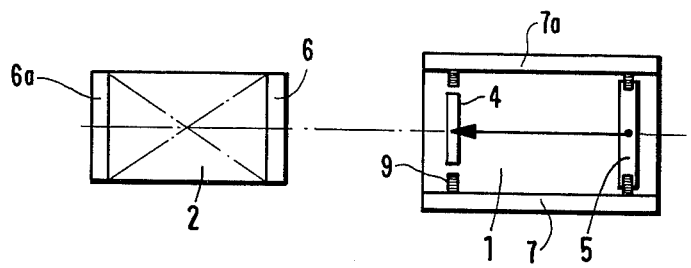

According to FIG. 6 of the drawings, which corresponds to the positon (idle running", the fingers 9 are in the position according to FIGS. 5a and 5b of the drawings and the transverse rail 5, with movement of the chain strands 3, 3a pushes the loading rods 8, 8a to the transport container 2 into the coupling position therewith.

Figure 8:
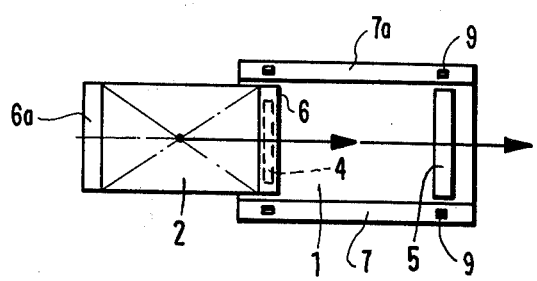

According to FIG. 7 of the drawings, the fingers 9 are then brought in the "loading" position, which corresponds to the position of the fingers 9 in FIGS. 4a and 4b. The transverse rail 5 now pulls the transport container 2 by means of the loading rods 8, 8a so far onto the loading device 1, such that one driver roller 4 engages with the front container rail 6 (FIG. 8).

The fingers 9 then are brought into the "overhauling" position according to FIGS. 3a and 3b of the drawings, thereby disengaging from the rails 6 and 5. The first driver roller 4 now brings the transport container 2 by movement of the chain strands 3, 3a into the middle position on the loading device 1 as illustrated in FIG. 1, whereby the second driver roller 4a then also becomes engaged in the container rail 6a. In this position the complete loading device 1 can be laterally moved or transported with the transport container 2 thereon, rotated about the vertical or perpendicular axis or raised or lowered; for this purpose on the case housing 12, the corresponding conveying movement and stroke or lift means (not shown) are provided.

In the further path of movement, the roller 4 leaves the container rail 6 and the second conveyor roller 4a conveys the transport container 2 into the next position (FIG. 9) on the end of the loading device 1, while the transverse rail 5 is moved over the lower stringer portion of the chain strands 3, 3a and is readied or prepared opposite-wise for the next cycle.

Figure 9:
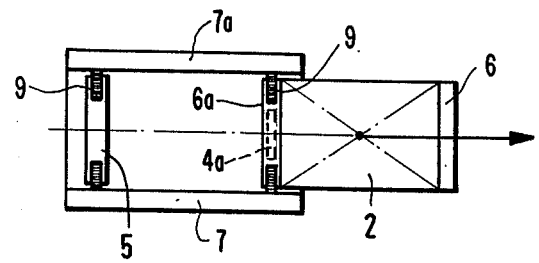

In FIG. 9 of the drawings, the fingers 9 then are brought into the "charging" position of FIG. 4a and 4b. The driver rail 5 pushes the transport container 2 into the target or object position (FIG. 10), for example in the tempering furnace, by means of the charging or loading rods, 8, 8a.

Figure 10:
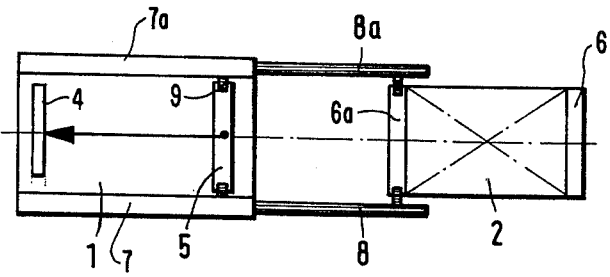

The fingers 9 in the position of FIG. 10 are then set in the "idle" position of FIGS. 5a and 5b of the drawings, and the transverse rail 5 pulls the charging rods 8, 8a back by reverse movement of the chain strands 3, 3a, in the loading device 1.

The doubling of the range of action by the loading of the charging rods 8, 8a, results altogether in an important advantage, whereby the insertion or loading function is at the same time the coupling function on the chain drive as well as on the transport container and can be applied or used symmetrically in two directions. The existing drive force of the chain thus is also useful beyond or outside the action range thereof. Furthermore it is advantageous that the force transmission from the chain over the loading rods to the transport container takes place free of transverse forces whereby the guide for the rods are unloaded or not placed under stress.

The function or operation of the fingers 9 on the loading rods change with the direction of transportation. The loading rods 8, 8a, are to be used in two directions, without having to rotate. Further by stepped insertion or charging of the loading rods, the coupling function can be differentiated and by different container rails any type of transport container could be conveyed. The coupling of the loading rods with the transport container can take place position-wise in arbitrary optional manner.

Furthermore it is advantageous that the extending loading rods run over the working surface and are there supported. They require thus no channels. The manner of construction of the charging or loading device of the present invention is so compact that by known manner per se it can be raised, lowered, turned and transported and thereby it can be used universally.

While I have disclosed one embodiment of the present invention, it is to be understood that this embodiment is given by example and not in a limiting sense.

I claim:

1. A loading device for the conveyance of transport containers, comprising two endless chains being rotatably mounted parallel to and spaced from each other and each of said chains defining upper portions, and lower portions, respectively, means for simultaneously rotating said two endless chains, two loading rods being mounted adjacent thereabove and parallel to said upper portions of said endless chains, respectively, and longitudinally displaceable relative thereto, said loading rods defining ends, two finger means arranged spaced from one another on each of said loading rods adjacent said ends thereof, said two finger means for releaseably operatively coupling said loading rods to adjacent of said two endless chains, respectively, and to a transport container, respectively, in a transport condition thereof, whereby said rods are longitudinally driven by said endless chains in longitudinally extending positions of said loading rods relative to said upper portions of said endless chains, whereby the transport container is moved by said longitudinal rods via said finger means, respectively, said upper portions of said endless chains being adapted to carry the transport container when the latter is located in positions over said endless chains on said upper portions of said endless chains, two driver rail means extend crosswise to said two endless chains and being connected to said two endless chains, said two driver rail means for operatively moveably engaging the transport container when the latter is in said positions on said upper portions of said endless chains, respectively, a transverse rail extends transversely to said two endless chains and being connected to both said endless chains and is located on corresponding one of said portions of said two endless chains when both said two driver rail means are located on the corresponding other of said portions of said two endless chains, two downwardly opening U-shaped container rail means for releaseably engaging at least one of said two driver rail means, respectively, when the transport container is in said positions on said upper portions of said endless chains, whereby the transport container can be moved by said endless chains via said driver rail means when the transport container is in said positions on said upper portions of said endless chains, said container rail means for being joined to said transport container on opposite ends thereof, respectively, means for rotating said loading rods operatively into and out of engagement with said transverse rail and said container rail means, respectively, said two finger means of both of said two loading rods for releaseably engaging said transverse rail and said container rail means, respectively, whereby said loading rods can be moved by said endless chains via said transverse rail and said transport container can be additionally moved via said loading rods, respectively, when said loading rods are in the longitudinally extended positions relative to said upper portions of said endless chains and the transport container is longitudinally spaced apart from said endless chains, respectively.

2. The loading device, as set forth in claim 1, further comprising means for mounting said loading rods, comprising two guide tubes each having a longitudinal slot, each of said loading rods is axially displaceably disposed in one of said guide tubes, respectively, the former surrounding the latter, means for axially fixedly and axially rotatably mounting said two guide tubes, said finger means project through said longitudinal slots, of said guide tubes, respectively.

3. The loading device, as set forth in claim 1, wherein said finger means constitute fingers welded on said loading rods and projecting therefrom.

4. The loading device, as set forth in claim 1, wherein said two driver rail means constitute rollers.

5. The loading device, as set forth in claim 1, wherein said transverse rail and said container rail means of the transport container include ends defining upwardly opening recesses and include a corresponding box shape, respectively, said rotating means for adjustably pivoting said finger means laterally and upwardly respectively in and out of said opening recesses, said ends of said transverse rail and said container rail means include projecting portions respectively projecting differently relative to one another and operatively engagingly coupling with said finger means, respectively, such that with a predetermined pivot position of said finger means, for guiding of said two loading rods via said transverse rail by said finger means in engagement therewith and with said finger means out of engagement with said container rail means, constituting an idle condition thereof, to and from a starting position centrally adjacent said endless chains, said finger means are in engagement with said transverse rail on said projecting portions thereof and extend beyond said projecting portions of said container rail means out of engagement with said projecting portions of said container rail means.

6. The loading device as set forth in claim 1, wherein said transverse rail and said two driver rail means are each connected to said endless chains equidistant from one another with respect to said endless chains.

7. The loading device as set forth in claim 6, wherein said two finger means on each of said loading rods are spaced from each other by the same spacing as that of said two driver rail means from one another.

8. The loading device as set forth in claim 1, wherein said two downwardly opening U-shaped container rail means removeably engage on said two driver rail means respectively when the transport container is in said positions on said endless chains.

* * * * *